United States Patent
Lin

(10) Patent No.: US 10,981,319 B2
(45) Date of Patent: Apr. 20, 2021

(54) HIGH STRENGTH BLOW-MOLDED STRUCTURE

(71) Applicant: DongGuan Shichang Metals Factory Ltd., DongGuan (CN)

(72) Inventor: Chen-Kang Lin, DongGuan (CN)

(73) Assignee: Dongguan Shichang Metals Factory Ltd., Dongguan (CN)

( * ) Notice: Subject to any disclaimer, the term of this patent is extended or adjusted under 35 U.S.C. 154(b) by 292 days.

(21) Appl. No.: 15/975,915

(22) Filed: May 10, 2018

(65) Prior Publication Data

US 2019/0283304 A1 Sep. 19, 2019

Related U.S. Application Data

(63) Continuation-in-part of application No. 29/640,679, filed on Mar. 16, 2018, and a continuation-in-part of application No. 29/640,977, filed on Mar. 19, 2018.
(Continued)

(30) Foreign Application Priority Data

Mar. 23, 2018 (CN) .......................... 201810246788.2

(51) Int. Cl.
*B29C 49/00* (2006.01)
*B29C 49/02* (2006.01)
(Continued)

(52) U.S. Cl.
CPC .......... *B29C 49/0005* (2013.01); *A47B 13/08* (2013.01); *A47C 5/12* (2013.01);
(Continued)

(58) Field of Classification Search
CPC ..... B29C 49/0005; B29C 49/02; B29C 49/20; B29C 49/0031; B29C 2049/2008;
(Continued)

(56) References Cited

U.S. PATENT DOCUMENTS 2,990,094 A 6/1961 Reifers
D198,145 S 5/1964 Randall
(Continued)

FOREIGN PATENT DOCUMENTS

WO 2014186921 A1 11/2014

OTHER PUBLICATIONS

Extended European Search Report for EP App. No. 19163365.0, dated Jul. 5, 2019, 9 pages.

*Primary Examiner* — Frank J Vineis
*Assistant Examiner* — Donald M Flores, Jr.
(74) *Attorney, Agent, or Firm* — Luedeka Neely Group, P.C.

(57) ABSTRACT

A blow-molded plastic structure has a hollow interior portion formed during a blow-molding process, and includes first and second outer portions that are spaced apart from each other, with the hollow interior portion disposed there between. The structure includes a pattern of structural stiffening features that are integrally formed in the second outer portion. The pattern of structural stiffening features includes a plurality of tripodal depressions disposed in rows and columns and a plurality of convex regions disposed in rows and columns between the plurality of tripodal depressions. Each convex region has a maximum height between the first and second outer portions. Each of the tripodal depressions extends into the hollow interior portion, includes three indentations disposed adjacent the first outer portion, and includes an island spaced away from the first outer portion. The island has three sides, each of which is disposed adjacent one of the three indentations.

25 Claims, 8 Drawing Sheets

Related U.S. Application Data

(60) Provisional application No. 62/645,216, filed on Mar. 20, 2018.

(51) Int. Cl.
|  |  |
|---|---|
| *B29C 49/20* | (2006.01) |
| *A47B 13/08* | (2006.01) |
| *A47C 5/12* | (2006.01) |
| *E04C 2/32* | (2006.01) |
| *B29L 31/44* | (2006.01) |

(52) U.S. Cl.
CPC .............. *B29C 49/02* (2013.01); *B29C 49/20* (2013.01); *E04C 2/326* (2013.01); *B29C 49/0031* (2013.01); *B29C 2049/2008* (2013.01); *B29L 2031/448* (2013.01); *E04C 2/32* (2013.01); *Y10T 428/24628* (2015.01); *Y10T 428/24661* (2015.01); *Y10T 428/24669* (2015.01); *Y10T 428/24702* (2015.01); *Y10T 428/24736* (2015.01)

(58) Field of Classification Search
CPC ... A47C 5/12; A47B 13/08; Y10T 428/24736; Y10T 428/24661; Y10T 428/24669; Y10T 428/24628; Y10T 428/24702; B29L 2031/448; B32B 3/06; B32B 7/05; E04C 2/32; E04C 2/326
See application file for complete search history.

(56) References Cited

U.S. PATENT DOCUMENTS

| | | |
|---|---|---|
| D198,146 S | 5/1964 | Randall |
| D305,405 S | 1/1990 | Wilkinson |
| D438,792 S | 3/2001 | Pero et al. |
| D447,684 S | 9/2001 | Högman |
| D465,417 S | 11/2002 | Apps |
| D509,386 S | 9/2005 | Haney |
| D514,452 S | 2/2006 | Enriquez |
| 7,069,865 B2 | 7/2006 | Strong et al. |
| 7,111,563 B2 | 9/2006 | Strong |
| 7,171,910 B2 | 2/2007 | Neunzert et al. |
| 7,331,297 B2 | 2/2008 | Strong et al. |
| D567,672 S | 4/2008 | Sheu |
| 7,475,643 B2 | 1/2009 | Haney et al. |
| D606,415 S | 12/2009 | Lavigne et al. |
| 7,634,970 B2 | 12/2009 | Strong et al. |
| 7,644,667 B2 | 1/2010 | Strong et al. |
| 7,814,844 B2 | 10/2010 | Haney et al. |
| D632,977 S | 2/2011 | Dijsktra et al. |
| 8,006,630 B2 | 8/2011 | Strong et al. |
| 8,033,228 B2 | 10/2011 | Haney et al. |
| 8,261,676 B2 * | 9/2012 | VanNimwegen .... A47B 3/0912 108/125 |
| 8,302,541 B2 | 11/2012 | Haney et al. |
| 8,342,107 B2 | 1/2013 | Mower et al. |
| 8,381,665 B2 | 2/2013 | Stanford |
| 8,381,666 B2 | 2/2013 | Stanford |
| 8,438,982 B2 | 5/2013 | Stanford |
| 8,578,865 B2 | 11/2013 | Haney et al. |
| 8,746,155 B2 | 6/2014 | Haney et al. |
| D735,585 S | 8/2015 | Tayara |
| D851,502 S | 6/2019 | Tayara |
| D866,007 S | 11/2019 | Nye et al. |
| D866,008 S | 11/2019 | Nye et al. |
| D866,009 S | 11/2019 | Nye et al. |
| D873,442 S | 1/2020 | Nye et al. |
| 2003/0217676 A1 | 11/2003 | Strong et al. |
| 2005/0103239 A1 | 5/2005 | Neunzert et al. |
| 2005/0160950 A1 | 7/2005 | Haney et al. |
| 2005/0249920 A1 * | 11/2005 | Kawakami ................ B32B 3/28 428/174 |
| 2006/0230989 A1 * | 10/2006 | Haney .................... B65D 11/24 108/57.25 |
| 2006/0283832 A1 * | 12/2006 | De Cleir ................. B65D 1/44 215/383 |
| 2010/0000448 A1 | 1/2010 | Lin et al. |
| 2011/0303355 A1 | 12/2011 | Sumi et al. |
| 2014/0037910 A1 | 2/2014 | Leng |
| 2017/0238698 A1 * | 8/2017 | Nye ....................... A47B 96/20 |

* cited by examiner

View B

View C

HIGH STRENGTH BLOW-MOLDED STRUCTURE

RELATED APPLICATIONS

This application claims priority to U.S. provisional patent application Ser. No. 62/645,216, filed Mar. 20, 2018, titled HIGH STRENGTH BLOW-MOLDED STRUCTURE, copending U.S. design patent application Ser. No. 29/640,679, filed Mar. 16, 2018, titled BLOW-MOLDED STRUCTURE, and copending U.S. design patent application Ser. No. 29/640,977, filed Mar. 19, 2018, titled BLOW-MOLDED STRUCTURE, the entire contents of which are incorporated herein by reference.

TECHNICAL FIELD

The disclosure relates to structures constructed from blow-molded plastic and, in particular, to high-strength, low-weight, blow-molded plastic structures.

BACKGROUND

Various items, such as tables, chairs, partitions, walls, and sports equipment are formed from plastic. In order to reduce the weight of the items, blow-molded plastic is typically used. A blow-molded plastic structure has outer walls that enclose an interior hollow space. While the hollow interior enables the structures to be light-weight, the hollow interior of such blow-molded items may also reduce the strength of the item so that the item is unable to support a relatively large amount of weight or force.

It is known that strengthening ribs made of metal or other durable material may be added to a blow-molded structure to increase the load-bearing strength of the structure. However, such strengthening ribs often significantly increase the weight of the structure and may create stress points in attachment locations that lead to mechanical failure of the structure.

Strengthening ribs may also be integrally formed from plastic during the blow-molding process in order to increase the load-bearing capability of the blow-molded structure. Such ribs may extend over portions of the length and width of the structure to provide load-bearing support for the structure. However, the integrally formed ribs typically require the use of thicker walls that add weight to the structure, increase production time, and increase the cost of producing such structures. The ribs may also interfere with other components of the structure, such as support legs for a table-top made of the blow-molded structure.

In view of the foregoing, there continues to be a need for blow-molded structures having improved load-bearing capability and a simple light-weight configuration.

SUMMARY

Accordingly, embodiments of the disclosure provide a blow-molded plastic structure having a hollow interior portion formed during a blow-molding process. The blow-molded plastic structure of a preferred embodiment includes a first outer portion and a second outer portion that is spaced apart from the first outer portion, wherein the hollow interior portion is disposed between the first and second outer portions. The structure includes a pattern of structural stiffening features that are integrally formed in the second outer portion. The pattern of structural stiffening features includes a plurality of tripodal depressions disposed in rows and columns. As the term is used herein, "tripodal" is an adjective form of tripod, and refers to a structure having three support features. The pattern of structural stiffening features also includes a plurality of convex regions disposed in rows and columns between the plurality of tripodal depressions. Each convex region has a maximum height between the first and second outer portions. Each of the tripodal depressions extends into the hollow interior portion, and includes three indentations disposed adjacent the first outer portion, and includes an island spaced away from the first outer portion. The island has three sides, each of which is disposed adjacent one of the three indentations.

In some embodiments, the centerline spacing between each island in each row of depressions is greater than three times the maximum height of the convex regions.

In some embodiments, the centerline spacing between each island in each row of depressions ranges from about 61.0 to about 68.8 millimeters.

In some embodiments, the centerline spacing between each island in each column of depressions is greater than three times the maximum height of the convex regions.

In some embodiments, the centerline spacing between each island in each column of depressions ranges from about 65.5 to about 72.5 millimeters.

In some embodiments, the centerline spacing between each island in each column of depressions ranges from about 49.1 to about 54.3 millimeters.

In some embodiments, an indentation in a tripodal depression in a row of tripodal depressions is spaced apart from a nearest indentation in a tripodal depression in an adjacent row of tripodal depressions by greater than three times the maximum height of the convex regions.

In some embodiments, an indentation in a tripodal depression in a row of tripodal depressions is spaced apart from a nearest indentation in a tripodal depression in an adjacent row of tripodal depressions by a distance ranging from 47.9 to 52.9 millimeters.

In some embodiments, an indentation in a tripodal depression in a row of tripodal depressions is spaced apart from a nearest indentation in a tripodal depression in an adjacent row of tripodal depressions by a distance ranging from 42.6 to 47.0 millimeters.

In some embodiments, an indentation in a tripodal depression in a column of tripodal depressions is spaced apart from a nearest indentation in a tripodal depression in an adjacent column of tripodal depressions by greater than three times the maximum height of the convex regions.

In some embodiments, an indentation in a tripodal depression in a column of tripodal depressions is spaced apart from a nearest indentation in a tripodal depression in an adjacent column of tripodal depressions by a distance ranging from 53.3 to 58.9 millimeters.

In some embodiments, an indentation in a tripodal depression in a column of tripodal depressions is spaced apart from a nearest indentation in a tripodal depression in an adjacent column of tripodal depressions by a distance ranging from 28.7 to 31.7 millimeters.

In some embodiments, the center-to-center spacing between the indentations within each tripodal depression ranges from about 11 mm to about 14 mm. In other embodiments, this spacing ranges from about 16.2 mm to about 19.8 mm.

In some embodiments, the convex regions have a radius of curvature ranging from about 22 to about 26 millimeters.

In some embodiments, the maximum height of the convex regions ranges from about 17.5 to about 19.3 millimeters.

In some embodiments, the maximum height of the convex regions ranges from about 15.9 to about 17.5 millimeters.

In some embodiments, the central portions of the three-sided islands are spaced away from the first outer portion by a distance that is greater than half of an average distance between the first outer portion and second outer portion.

In some embodiments, the central portion of each three-sided island is spaced away from the first outer portion by a distance that ranges from about 6.0 to 7.5 millimeters.

In some embodiments, the central portion of each three-sided island is spaced away from the first outer portion by a distance that ranges from about 7.5 to 8.9 millimeters.

In some embodiments, the distance between the first outer portion and the second outer portion within each indentation ranges from about 2.5 to about 3.3 millimeters.

In some embodiments, the distance between the first outer portion and the second outer portion within each indentation ranges from about 3.6 to about 4.8 millimeters.

In some embodiments, the blow-molded plastic structure comprises a portion of a tabletop, a chair, a bench, or a structural panel.

In some embodiments, the blow-molded plastic structure comprises a portion of a circular tabletop.

The foregoing and other aspects, features and advantages of the disclosed embodiments will become more fully apparent from the following detailed description of preferred embodiments and appended claims.

BRIEF DESCRIPTION OF THE DRAWINGS

The appended drawings contain figures illustrating aspects of preferred embodiments of the disclosure and further clarifying advantages and features of the disclosed embodiments. It will be appreciated that the drawings depict only preferred embodiments and are not intended to limit the scope of the claims. Accordingly, the disclosed embodiments are described and explained with additional specificity and detail through the use of the accompanying drawings in which:

DETAILED DESCRIPTION OF THE PREFERRED EMBODIMENTS

As set forth above, the disclosure is generally directed to blow-molded structures that have increased strength and light weight. While strength and weight are important considerations, it will be appreciated that the blow-molded structures described herein may be adapted for use with other structures that do not require increased strength and light weight.

As used herein, the terms top and bottom, front and rear, right and left, horizontal and vertical, and row and column are intended to provide understanding with regard to the figures and are not intended to limit the orientation of the disclosed structures. The blow-molded structures described herein may be disposed in a variety of desired positions—including various angles, sideways and even upside-down.

Figure 1:
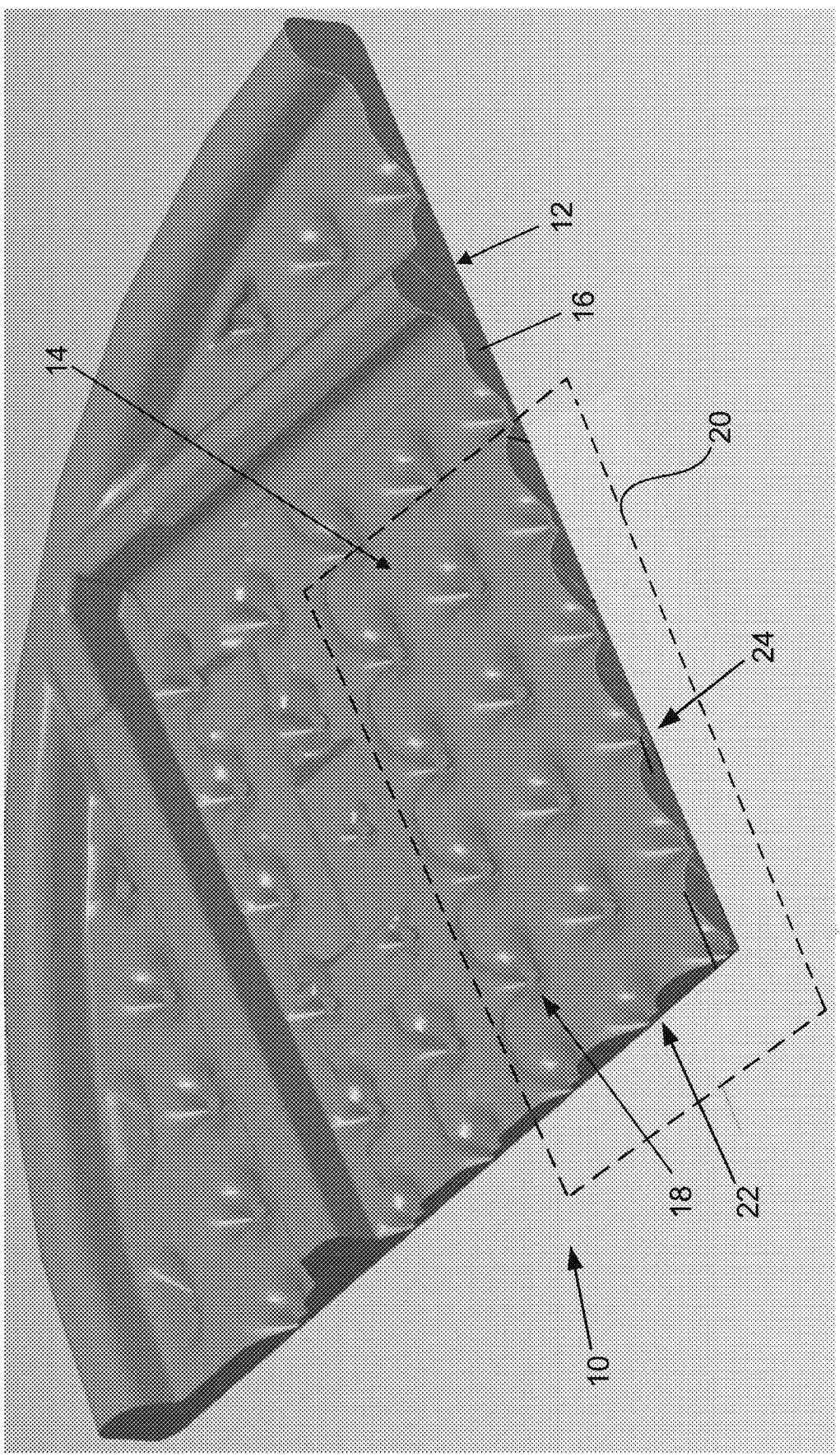
FIG. 1 is a partial perspective view of a second outer portion of a blow-molded plastic structure according to the disclosure.
Figure 2:
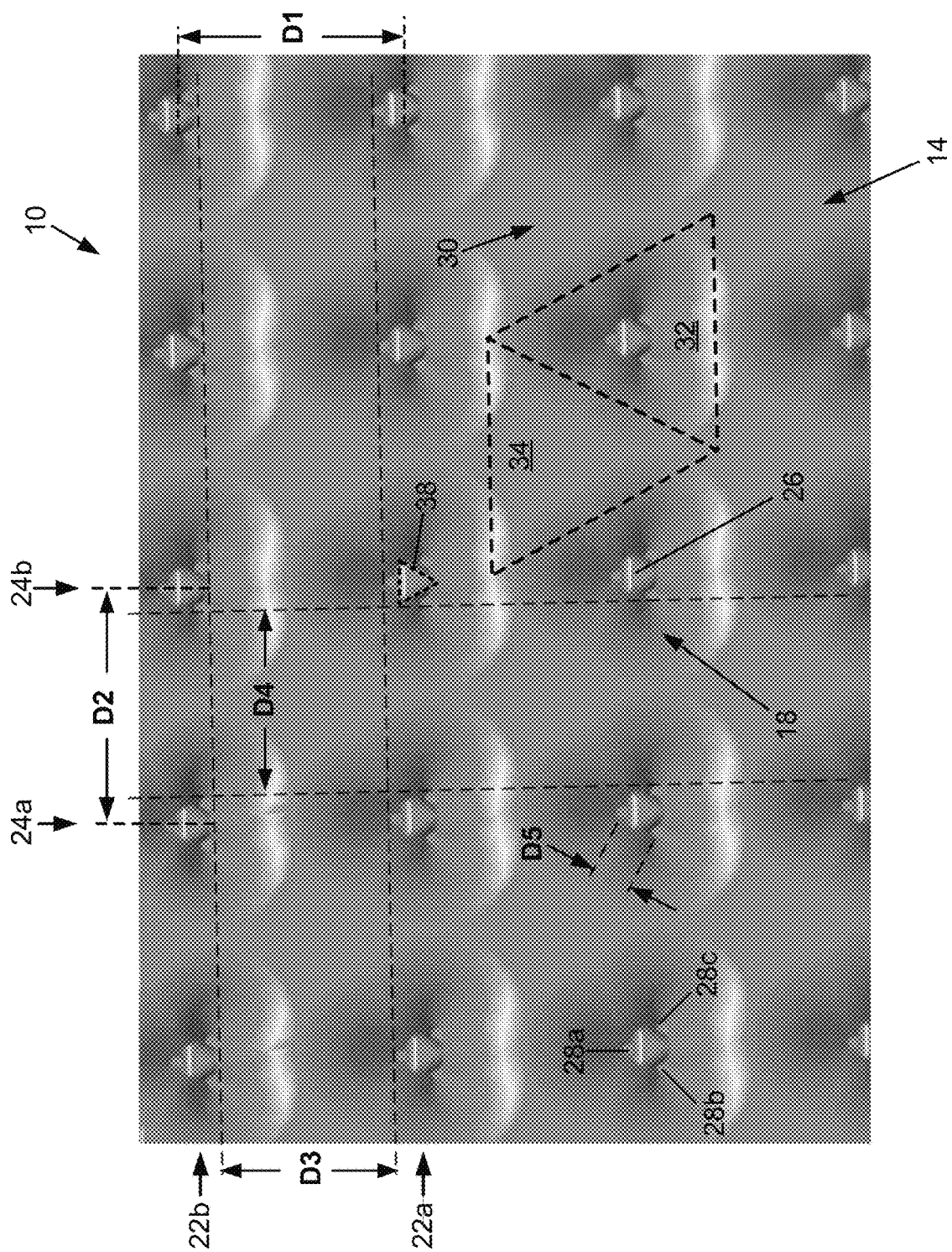
FIG. 2 is a partial plan view of the second outer portion of a blow-molded plastic structure according to a first embodiment.
Figures 4A, 4B:
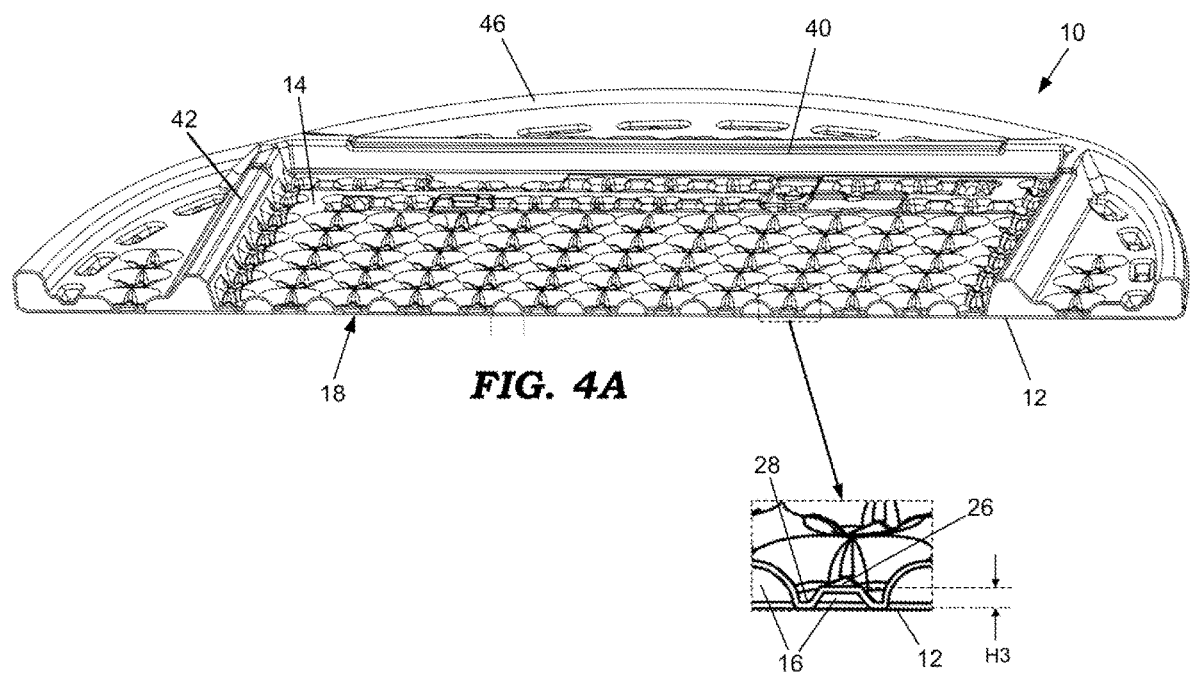
FIG. 4A is a cross-sectional perspective view of a portion of a tabletop containing a blow-molded plastic structure according to the disclosure.
FIG. 4B depicts a detailed portion of the cross-sectional perspective view of FIG. 4A.
Figure 5:
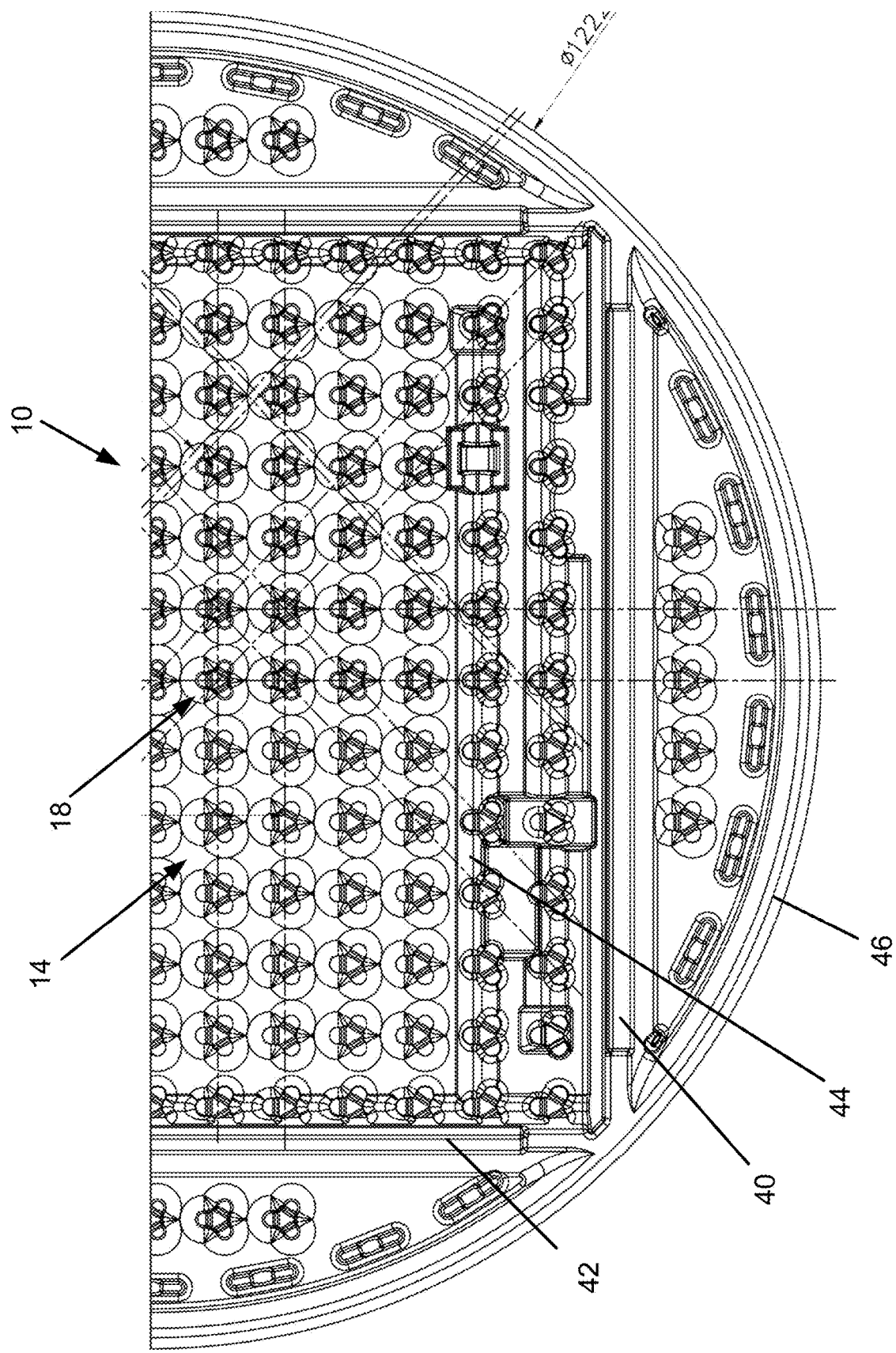
FIG. 5 is a plan view of a second outer portion of a tabletop containing a blow-molded plastic structure according to the disclosure.

With reference now to FIGS. 1 and 2, there is shown in perspective and plan views, a portion of a blow-molded plastic structure 10 according to an embodiment of the invenion. The structure 10 includes a first outer portion 12, and a second outer portion 14 that is generally spaced apart from the first outer portion 12. In some embodiments, the first outer portion 12 is generally planar. The first outer portion 12 and the second outer portion 14 enclose a hollow interior portion 16 formed during the blow-molding process. Specifically, the disclosure is directed to a pattern of structural stiffening features that include tripodal depressions 18 formed as part of the second outer portion 14 of the structure 10, such as the pattern of tripodal depressions 18 within the dashed line box 20. Each depression 18 extends toward the first outer portion 12 of the structure. The depressions 18 are arranged in rows 22 and columns 24 in the second outer portion 14 of the structure 10, and this pattern may be repeated over a substantial portion of the second outer portion 14 of the structure. As shown in FIGS. 4A and 5, the rows 22 and columns 24 may be arranged such that each tripodal depression 18 is closely adjacent to another tripodal depression 18 in an adjacent row 22 and column 24 over a substantial portion of the second outer portion 14.

Referring now to FIG. 2, a plan view of the second outer portion 14 of a first embodiment of the structure 10 is shown. In the center of each depression 18 is a three-sided island 26 space part from the first outer portion 12. Each depression 18 also includes an indentation adjacent to each side of the three sided island 26, shown as indentations 28a, 28b and 28c. Accordingly, as shown, the indentations 28a-c and island 26 form the central portion of the tripodal depression 18 in the second outer portion 14 of the structure 10. In a preferred embodiment, the center-to-center spacing D5 between the indentations 28a-c within each depression 18 ranges from about 11 mm to about 14 mm. In a preferred embodiment, the distance D5 is 12.5 mm. A centerline of each row 22a of tripodal depressions 18 is spaced apart from an adjacent row 22b by a distance D1 that ranges from about 62.3 mm to about 68.8 mm. In a preferred embodiment, the distance D1 is 65.5 mm. Likewise, each column 24a of tripodal depressions 18 is spaced apart from an adjacent column 24b by a distance D2 that ranges from about 65.5 mm to about 72.5 mm. In a preferred embodiment, the distance D2 is 69.0 mm.

As shown, the indentations 28a in one row 22a are spaced from indentations 28b and 28c in an adjacent row 22b by a distance D3 that ranges from about 47.9 mm to about 52.9 mm, and indentations 28b in column 24b are spaced from indentations 28c in column 24a by a distance D4 that ranges from about 53.3 mm to about 58.9 mm. In a preferred embodiment, the distance D3 is 50.4 mm and the distance D4 is 56.1 mm.

Although a preferred embodiment includes three indentations 28a-28c in each depression 18 that form a tripodal depression structure, other embodiments may include more than three indentations. For example, one embodiment provides four indentations arranged in a rectangular layout within each depression 18, thereby forming a quadripedal depression structure. Multi-indentation depression structures are generally referred to herein as multipedal depression structures.

With reference to FIGS. 3A, 3B, 3C, 4A, and 4B, partial perspective, cross-sectional views of the first embodiment of the plastic molded structure 10 are illustrated. As shown, the structural stiffening features include convex regions 30 of the second outer portion 14 that are disposed between the depressions 18 and have a height H1 (distance from the first outer portion 12) that ranges from about 17.5 mm to about 19.3 mm, and a radius R of curvature that ranges from about 22 mm to about 26 mm. In a preferred embodiment, the height H1 is 18.4 mm and the radius R is 24.0 mm.

Figure 3A:
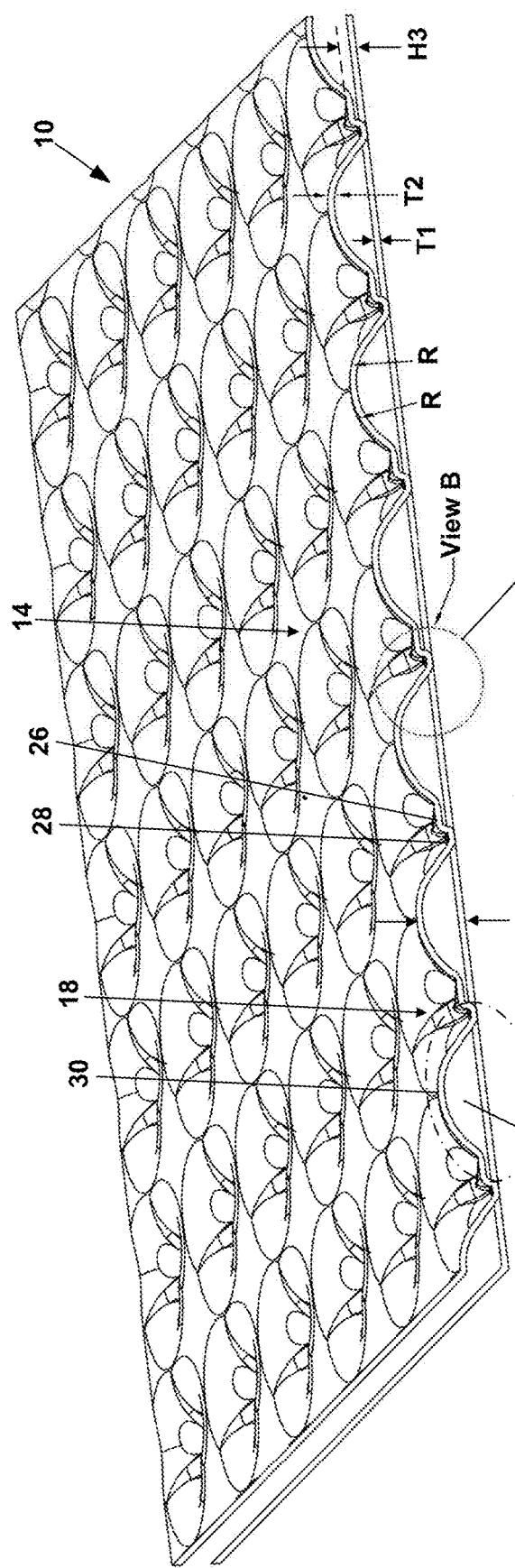
FIGS. 3A, 3B, and 3C are partial cross-sectional perspective views of a blow-molded plastic structure according to the first embodiment.
Figure 3B:
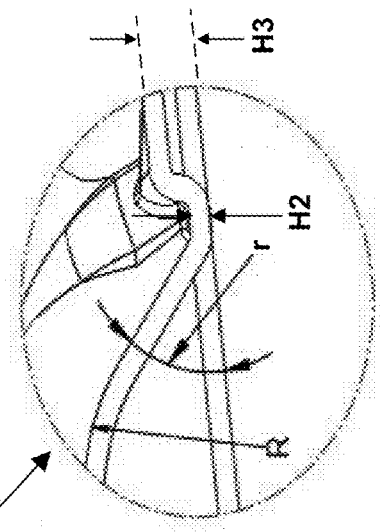
Figure 3C:
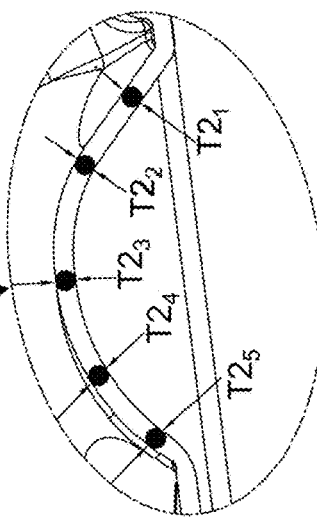

As shown in FIG. 3B, within each indentation 18, the height H2 between the second outer portion 14 and the first outer portion 12 ranges from about 2.5 mm to about 3.3 mm and is preferably less than about 16% of the height H1. In a preferred embodiment, the height H2 is 2.9 mm. Also within each indentation 28, the second outer portion 14 may be spaced apart from or may contact the first outer portion 12 of the blow-molded plastic structure, depending on the load placed on the structure 10. The three-sided islands in the depressions 18 have a central height H3 that is preferably more than about 37% of the height H1 and less than about 2.4 times the height H2. The height H3 may range from about 6.0 mm to about 7.5 mm. In a preferred embodiment, the height H3 is 6.9 mm. The total depth of the each indentation 28 (H1-H2) and is preferably at least about 84% of the height H1.

Also shown in FIG. 3B, an angle r is formed between the first outer portion 12 and the second outer portion 14. In various embodiments, the angle r may range from about 38 degrees to about 55 degrees. In one preferred embodiment, the angle r is about 40.6 degrees.

This pattern of structural stiffening features, including the convex regions 30 and the depressions 18, provides improved strength to the blow molded plastic structure 10 and reduces the flexibility of the structure 10 under a load.

In order to provide the desired structural performance of the blow-molded plastic structure 10, the plastic material of the second outer portion 14 typically has a material thickness T2 ranging from about 2.06 mm to about 2.54 mm. In a preferred embodiment depicted in FIG. 3C, the material thickness of the second outer portion 14 may vary across the convex region 30. Table 1 below provides three examples of material thicknesses at five points within the convex region 30. As listed in Table 1, the dimensions T1, H1, H2, and H3 are slightly different in each example. As will be appreciated by those skilled in the art, the plastic thicknesses T2 and T1 of outer portions 14 and 12 may vary depending on the particular application for the blow-molded plastic structure 10. Accordingly, a relatively light-weight blow-molded plastic structure 10 may be provided by using the structural configuration described herein.

TABLE 1

| Example | T1 | $T2_1$ | $T2_2$ | $T2_3$ | $T2_4$ | $T2_5$ | H1 | H2 | H3 |
|---|---|---|---|---|---|---|---|---|---|
| 1 | 2.15 | 2.25 | 2.27 | 2.29 | 2.25 | 2.06 | 18.39 | 2.87 | 6.85 |
| 2 | 2.51 | 2.45 | 2.36 | 2.49 | 2.54 | 2.38 | 18.52 | 3.06 | 6.73 |
| 3 | 2.41 | 2.40 | 2.51 | 2.45 | 2.34 | 2.24 | 18.56 | 3.01 | 6.81 |

Referring again to FIG. 2, the area occupied by each depression 18 may be approximated by a triangle 32, and area occupied by each convex region 30 may be approximated by a triangle 34. The combined total areas of the triangles 32 range from about 45% to about 55% of the total surface area of the second outer portion 14. Likewise, the combined total areas of the triangles 34 range from about 55% to about 45% of the total surface area of the second outer portion 14. Accordingly, a ratio between the total surface area of the convex regions 30 and the total surface area of the depressions 18 ranges from about 0.82 to about 1.22. Each of the three-sided islands 26 may be approximated by a triangle 38 having a surface area that is less than or equal to about 4% of the surface area of the triangle 32.

As shown in FIGS. 4A and 5, the depressions 18 cover a substantial portion of the second outer portion 14 of the blow-molded plastic structure 10. Additionally, while the depressions 18 are shown and described as being located in the second outer portion 14 of the structure 10, the depressions 18 be formed in any desired portion of the structure 10. The depressions 18 may be spaced so that each depression 18 contacts an adjacent depression in an adjacent row 22 and adjacent column 24 thereof over a significant portion of the second outer portion 14.

While the tripodal depressions 18, convex regions 30, and three-sided islands 26 provide increased load carrying characteristics for the blow-molded plastic structure 10, the second outer portion 14 may include additional structures that provide increased resistance to the flexibility of the structure 10. In some embodiments, the second outer portion 14 also includes one or more beams 40 and 42 which may be integrally molded into the second outer portion 14 and may surround an area 44 containing the tripodal depressions 18 as shown. Additional stiffening of the second outer portion 14 may be provided by a raised lip 46 that is also integrally molded into the second outer portion 14 of the structure 10.

Advantageously, the relatively small distance between the depressions 18 increases the structural integrity and strength of the blow-molded structure 10, which allows the thicknesses T1 and T2 of the first and second outer portions 12 and 14 of the blow-molded structure 10 to be reduced. Accordingly, less plastic material may be used to construct the blow-molded plastic structures 10 because of the reduced thicknesses of the first and second outer portions. Minimizing the amount of plastic used to produce the structure 10 may reduce the cost of the structure as well as reduce cooling times and thus manufacturing times for the structures 10. More rapid cooling of the structure 10 enables the structure to be removed from the mold more quickly. The size and shape of the depressions 18 may also reduce the need for multiple beams 40 and 42 to reduce the flexibility of the structure 10.

Figure 6:
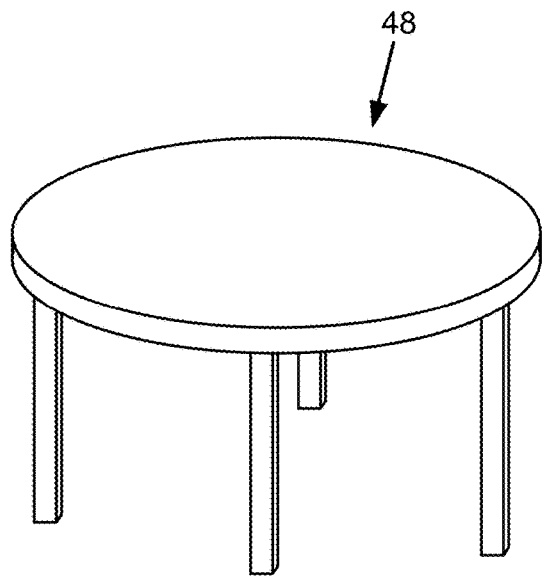
FIGS. 6 and 8 are perspective views, not to scale, of tables containing a blow-molded plastic structure according to the disclosure.
Figure 7:
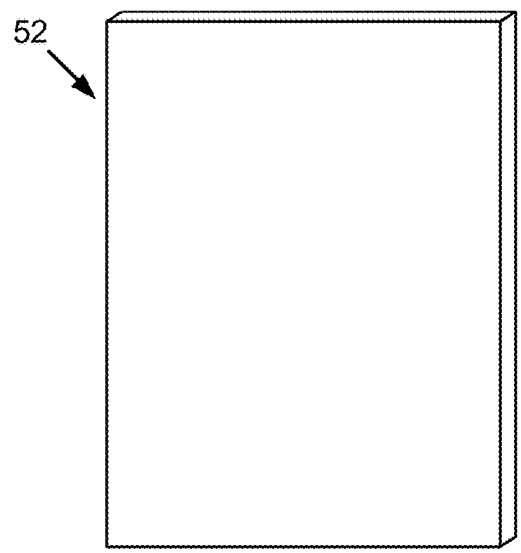
FIG. 7 is a perspective view, not to scale, of a panel containing a blow-molded plastic structure according to the disclosure.
Figure 8:
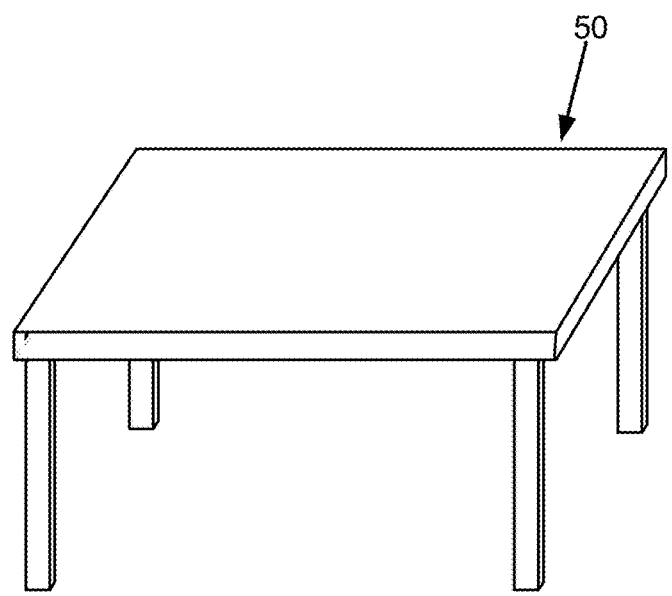
Figure 9:
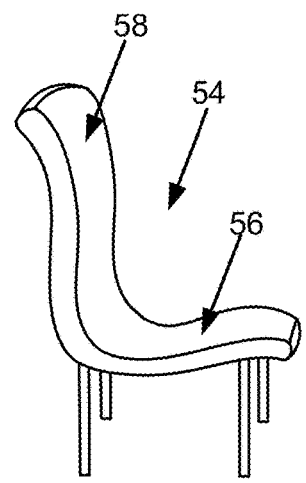
FIG. 9 is a perspective view, not to scale, of a chair containing a blow-molded plastic structure according to the disclosure.
Figure 10A:
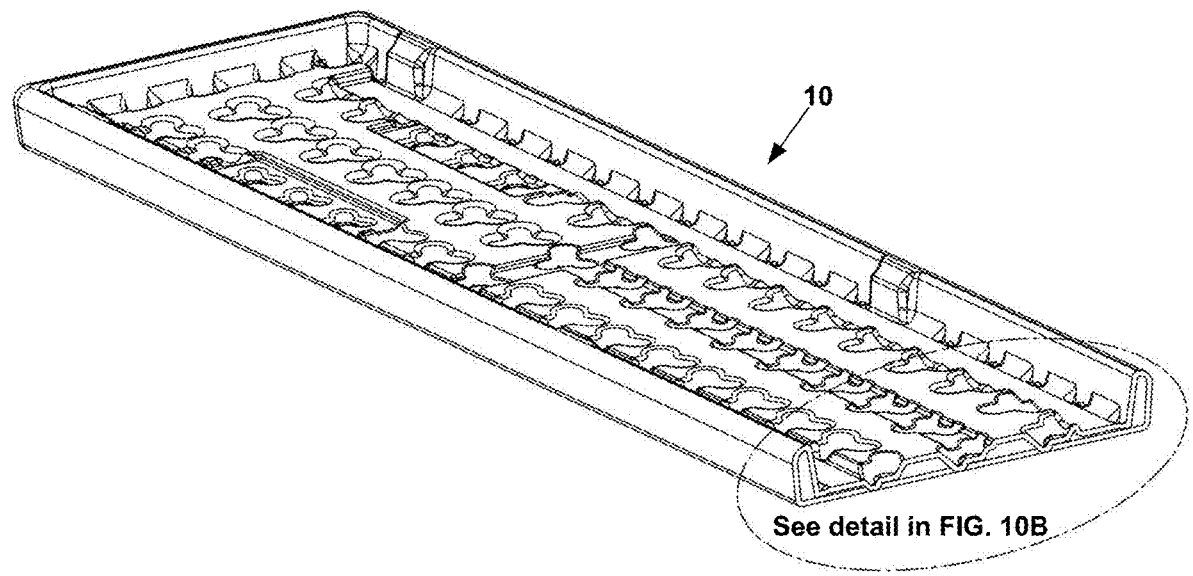
FIGS. 10A and 10B are cross-sectional perspective views of a blow-molded plastic structure according to a second embodiment.

Non-limiting examples of items that may incorporate the blow-molded structure 10 may include tables 48 and 50 (FIGS. 6 and 8), which may be foldable and/or collapsible tables, a partition wall 52 (FIG. 7) that may be used as a structural panel in a wall or partition or other portions of a building, a chair 54 (FIG. 9) that may use the blow-molded plastic structure 10 as part of a seat 56 and/or back support 58 thereof, and a bench (FIG. 10A).

Figure 11:
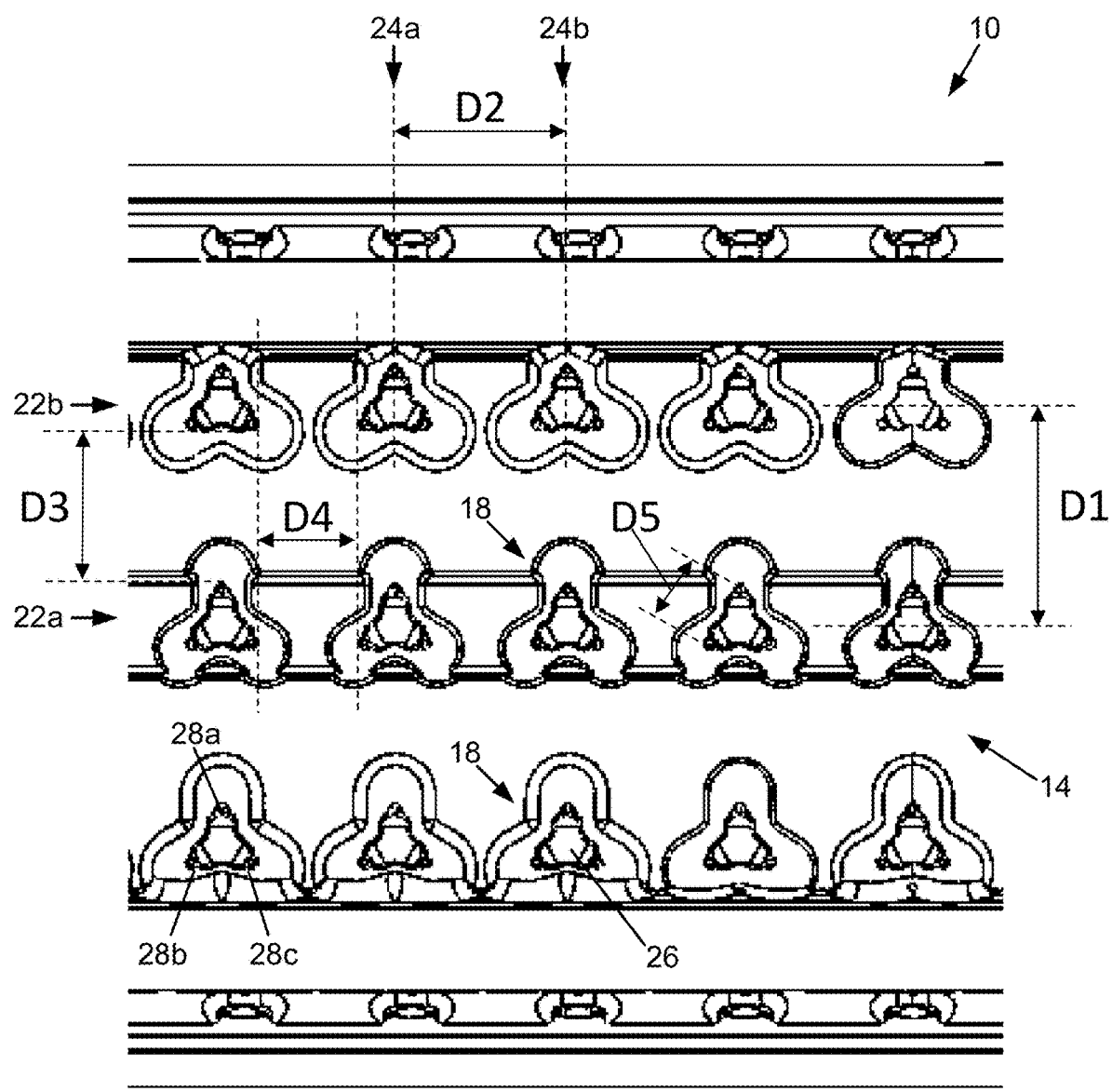
FIG. 11 is a partial plan view of the second outer portion of a blow-molded plastic structure according to the second embodiment.

Referring now to FIG. 11, a plan view of the second outer portion 14 of a second embodiment of the structure 10 is shown. As in the first embodiment, in the center of each depression 18 is a three-sided island 26 space part from the first outer portion 12. Each depression 18 also includes an indentation adjacent to each side of the three sided island 26, shown as indentations 28a, 28b and 28c. The indentations 28a-c and island 26 form the central portion of the tripodal depression 18. In the second embodiment, the center-to-center spacing D5 between the indentations 28a-c within each depression 18 ranges from about 16.2 mm to about 19.8 mm. In a preferred embodiment, the distance D5 is 18.0 mm. A centerline of each row 22a of tripodal depressions 18 is spaced apart from an adjacent row 22b by a distance D1 that ranges from about 61.0 mm to about 67.4 mm. In a preferred embodiment, the distance D1 is 64.2 mm. Likewise, each column 24a of tripodal depressions 18 is spaced apart from an adjacent column 24b by a distance D2 that ranges from about 49.1 mm to about 54.3 mm. In a preferred embodiment, the distance D2 is 51.7 mm. As shown, the indentations 28a in one row 22a are spaced from indentations 28b and 28c in an adjacent row 22b by a distance D3 that ranges from about 42.6 mm to about 47.0 mm, and indentations 28b in column 24b are spaced from indentations 28c in column 24a by a distance D4 that ranges from about 28.7 mm to about 31.7 mm. In a preferred embodiment, the distance D3 is 44.8 mm and the distance D4 is 30.2 mm.

Figure 10B:
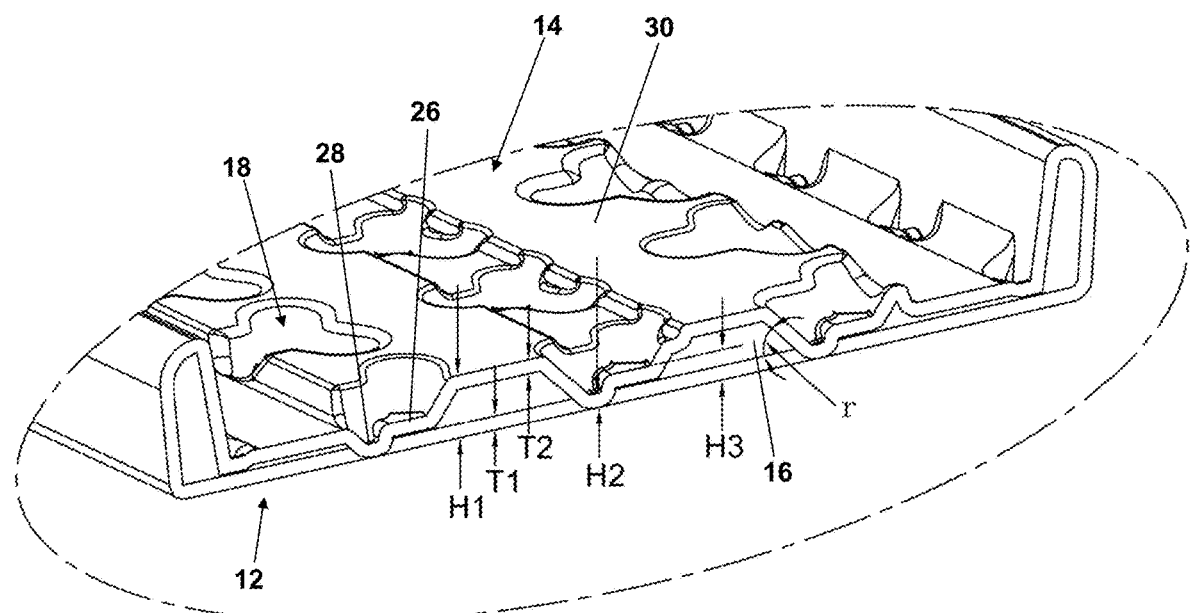

With reference to FIGS. 10A and 10B, a partial perspective, cross-sectional view of the second embodiment of the plastic molded structure 10 is illustrated. As shown, the structural stiffening features include regions 30 of the second outer portion 14 that are disposed between the depressions 18 and have a height H1 (distance from the first outer portion 12) that ranges from about 16.0 mm to about 17.8 mm. In a preferred embodiment, the height H1 is 16.9 mm.

As shown in FIG. 10B, within each indentation 18, the height H2 between the second outer portion 14 and the first outer portion 12 ranges from about 3.6 mm to about 4.8 mm and is preferably less than about 25% of the height H1. In a preferred embodiment, the height H2 is 4.2 mm. The three-sided islands in the depressions 18 have a central height H3 that is preferably more than about 49% of the height H1 and less than about two times the height H2. The height H3 may range from about 7.5 mm to about 8.9 mm. In a preferred embodiment, the height H3 is 8.4 mm. The total depth of the each indentation 28 (H1-H2) and is preferably at least about 75% of the height H1.

Also shown in FIG. 10B, an angle r is formed between the first outer portion 12 and the second outer portion 14. In various embodiments, the angle r may range from about 38 degrees to about 55 degrees. In one preferred embodiment, the angle r is about 44.2 degrees.

In order to provide the desired structural performance of the blow-molded plastic structure 10, the plastic material of the second outer portion 14 typically has a material thickness T2 ranging from about 2.6 mm to about 3.3 mm. The plastic material of the first outer portion 12 preferably has a material thickness T1 ranging from about 3.1 mm to about 3.8 mm. Table 2 below provides three examples of material thicknesses T1 and T2 and with corresponding variations in height dimensions H1, H2, and H3.

TABLE 2

| Example | T1 | T2 | H1 | H2 | H3 |
|---|---|---|---|---|---|
| 1 | 3.78 | 3.34 | 16.81 | 4.22 | 8.24 |
| 2 | 3.58 | 3.04 | 16.87 | 4.18 | 8.35 |
| 3 | 3.07 | 2.62 | 16.88 | 4.07 | 8.45 |

Advantages Over Conventional Structures

Ease of Production.

Because the edges of the depressions 18 have a large radius of curvature (R), the structure 10 can be more easily removed from the blow molding machine.

Increased Strength.

During the production, the quantity of plastic material (such as HDPE) provided to the mold must be adjusted to provide an optimum amount of material for the drawing of the depression structure 14 in the mold. The curved structure of the depressions 18 described herein allows for higher quantities of the plastic material for the entire structure 10, thereby helping to ensure that the areas of the structure around the depressions 18 will not be too soft when drawn in the mold. In this way, adequate strength can be more evenly maintained across the top and bottom surfaces of the structure 10.

Reduced Defective Rate.

Because of the large radius of curvature (R) of the depressions 18, the depth to which material is drawn in the mold is not as deep as is typical of conventional blow-molded structures. Thus, the drawing area of the bottom surface of the structure 10 will not be too soft, thereby significantly reducing the rate of defects caused by low strength in the bottom surface.

Better Performance.

Because the depressions 18 are not as deep as depressions in conventional blow-molded structures, the bottom surface of the structure 10 can be thinner, which requires less material. Less material in the bottom surface allows for more material to be used in the top surface without an overall increase in material per unit. This allows for the top surface to be made thicker, and therefore stronger and more durable, which results in better physical performance, such as in impact tests and loading tests.

Less Material Required for Production.

Also because the depressions 18 are not as deep as depressions in conventional blow-molded structures, less material per unit is needed for production of the structure 10, while maintaining at least the same strength as conventional structures.

Reduced Production Time.

Because of the depression structure, the wall thickness over the entire structure 10 can be more even than is possible with conventional blow-molded structures. This allows production workers to be able to adjust and fine-tune the operation of the blow-mold machine for the structure 10 faster and more efficiently than was possible with conventional structures. This reduces the idle time for the machine.

Support of Three-Indentation Depressions.

Because the depressions 18 having three indentations 28a, 28b, 28c, can be more evenly distributed across the bottom surface of the structure 10, the material drawing rate in the mold can be reduced. Although a four-indentation (quadripedal) depression embodiment may provide greater strength overall, quadripedal depressions require a higher drawing rate, which requires more material per unit for production. Thus, from a material standpoint, the tripodal depressions 18 of the preferred embodiment provide an advantage over a four-indentation design.

The present invention may be embodied in other specific forms without departing from its spirit or essential characteristics. The described embodiments are to be considered in all respects only as illustrative and not restrictive. The range and scope of the disclosed embodiments is, therefore, indicated by appended claims. All changes which come within meaning and scope of the appended claims are to be embraced within their scope.

What is claimed is:

1. A blow-molded plastic structure having a hollow interior portion formed during a blow-molding process, the blow-molded plastic structure comprising:
    a first outer portion;
    a second outer portion that is spaced apart from the first outer portion, wherein the hollow interior portion is disposed between the first and second outer portions; and
    a pattern of structural stiffening features integrally formed in the second outer portion, the pattern of structural stiffening features comprising:
        a plurality of tripodal depressions extending into the hollow interior portion and disposed in rows and columns, each depression including:
            no more than three indentations disposed in a triangular arrangement adjacent the first outer portion; and
            a single triangular island centrally disposed between the three indentations, the triangular island comprising:
                no more than three sides, each disposed adjacent a corresponding one of the three indentations; and
                a central triangular portion disposed in the center of the depression and between the three sides and spaced away from the first outer portion, such that the hollow interior portion is disposed between the central triangular portion and the first outer portion; and
        a plurality of convex regions, each convex region disposed between two adjacent depressions in the plurality of depressions, each convex region having a maximum height between the first and second outer portions, wherein the second outer portion within each convex region has a radius of curvature that defines a continuous arc connecting the two adjacent depressions.

2. The blow-molded plastic structure of claim 1, wherein a centerline spacing between each island in each row of depressions is greater than three times the maximum height of the convex regions.

3. The blow-molded plastic structure of claim 1, wherein a centerline spacing between each island in each row of depressions ranges from about 61.0 to about 68.8 millimeters.

4. The blow-molded plastic structure of claim 1, wherein a centerline spacing between each island in each column of depressions is greater than three times the maximum height of the convex regions.

5. The blow-molded plastic structure of claim 1, wherein a centerline spacing between each island in each column of depressions ranges from about 65.5 to about 72.5 millimeters.

6. The blow-molded plastic structure of claim 1, wherein a centerline spacing between each island in each column of depressions ranges from about 49.1 to about 54.3 millimeters.

7. The blow-molded plastic structure of claim 1, wherein one of the three indentations in a first tripodal depression in a row of tripodal depressions is spaced apart from a nearest one of the three indentations in a second tripodal depression in an adjacent row of tripodal depressions by greater than three times the maximum height of the convex regions.

8. The blow-molded plastic structure of claim 1, wherein one of the three indentations in a first tripodal depression in a row of tripodal depressions is spaced apart from a nearest one of the three indentations in a second tripodal depression in an adjacent row of tripodal depressions by a distance ranging from 47.9 to 52.9 millimeters.

9. The blow-molded plastic structure of claim 1, wherein one of the three indentations in a first tripodal depression in a row of tripodal depressions is spaced apart from a nearest one of the three indentations in a second tripodal depression in an adjacent row of tripodal depressions by a distance ranging from 42.6 to 47.0 millimeters.

10. The blow-molded plastic structure of claim 1, wherein one of the three indentations in a first tripodal depression in a column of tripodal depressions is spaced apart from a nearest one of the three indentations in a second tripodal depression in an adjacent column of tripodal depressions by greater than three times the maximum height of the convex regions.

11. The blow-molded plastic structure of claim 1, wherein one of the three indentations in a first tripodal depression in a column of tripodal depressions is spaced apart from a nearest one of the three indentations in a second tripodal depression in an adjacent column of tripodal depressions by a distance ranging from 53.3 to 58.9 millimeters.

12. The blow-molded plastic structure of claim 1, wherein one of the three indentations in a first tripodal depression in a column of tripodal depressions is spaced apart from a nearest one of the three indentations in a second tripodal depression in an adjacent column of tripodal depressions by a distance ranging from 28.7 to 31.7 millimeters.

13. The blow-molded plastic structure of claim 1, wherein the radius of curvature ranges from about 22 to about 26 millimeters.

14. The blow-molded plastic structure of claim 1, wherein the maximum height of the convex regions ranges from about 17.5 to about 19.3 millimeters.

15. The blow-molded plastic structure of claim 1, wherein the maximum height of the convex regions ranges from about 15.9 to about 17.5 millimeters.

16. The blow-molded plastic structure of claim 1, wherein the triangular central portions of the islands are spaced away from the first outer portion by a distance that is greater than half of an average distance between the first outer portion and second outer portion.

17. The blow-molded plastic structure of claim 1, wherein the triangular central portion of each island is spaced away from the first outer portion by a distance that ranges from about 6.0 to 7.5 millimeters.

18. The blow-molded plastic structure of claim 1, wherein the triangular central portion of each island is spaced away from the first outer portion by a distance that ranges from about 7.5 to 8.9 millimeters.

19. The blow-molded plastic structure of claim 1, wherein a distance between the first outer portion and the second outer portion at each indentation ranges from about 2.5 to about 3.3 millimeters.

20. The blow-molded plastic structure of claim 1, wherein a distance between the first outer portion and the second outer portion at each indentation ranges from about 3.6 to about 4.8 millimeters.

21. The blow-molded plastic structure of claim 1, constituting a portion of a tabletop, a chair, a bench, or a structural panel.

22. The blow-molded plastic structure of claim 21, wherein the tabletop is circular.

23. A blow-molded plastic structure having a hollow interior portion formed during a blow-molding process, the blow-molded plastic structure comprising:
   a first outer portion;
   a second outer portion that is spaced apart from the first outer portion, wherein the hollow interior portion is disposed between the first and second outer portions; and
   a pattern of structural stiffening features integrally formed in the second outer portion, the pattern of structural stiffening features comprising:
      a plurality of tripodal depressions extending into the hollow interior portion and disposed in rows and columns, each depression including:
         no more than three indentations disposed in a triangular arrangement adjacent the first outer portion; and
         a single triangular island centrally disposed between the three indentations, the triangular island comprising:
            no more than three sides, each disposed adjacent a corresponding one of the three indentations; and
            a central triangular portion disposed in the center of the depression and between the three sides and spaced away from the first outer portion, such that the hollow interior portion is disposed between the central triangular portion and the first outer portion; and
      a plurality of convex regions in the second outer portion, each convex region disposed between two adjacent depressions in the plurality of depressions, each convex region having a maximum height between the first and second outer portions, wherein the second outer portion within each convex region has a radius of curvature that defines a continuous arc connecting the two adjacent depressions,
   wherein a first centerline spacing between each island in each row of depressions is greater than three times the maximum height of the convex regions, and
   wherein a second centerline spacing between each island in each column of depressions is greater than three times the maximum height of the convex regions.

24. The blow-molded plastic structure of claim 23, wherein one of the three indentations in a first tripodal depression in a row of tripodal depressions is spaced apart from a nearest one of the three indentations in a second tripodal depression in an adjacent row of tripodal depressions by greater than three times the maximum height of the convex regions.

25. The blow-molded plastic structure of claim 23, wherein one of the three indentations in a first tripodal depression in a column of tripodal depressions is spaced apart from a nearest one of the three indentations in a second tripodal depression in an adjacent column of tripodal depressions by greater than three times the maximum height of the convex regions.

* * * * *